Jan. 30, 1968 G. E. ROBERTS 3,366,959
CHART POSITION INDICATING APPARATUS
Filed May 27, 1966

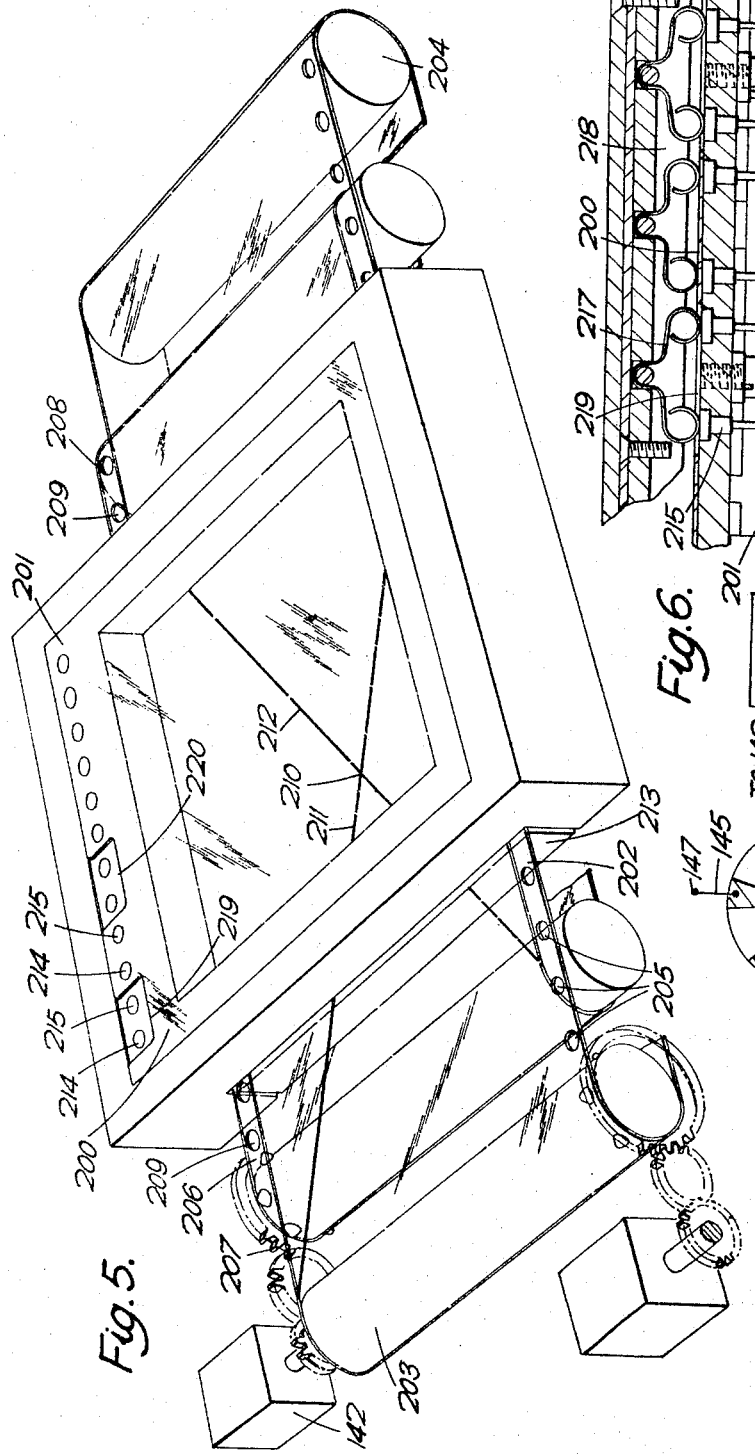
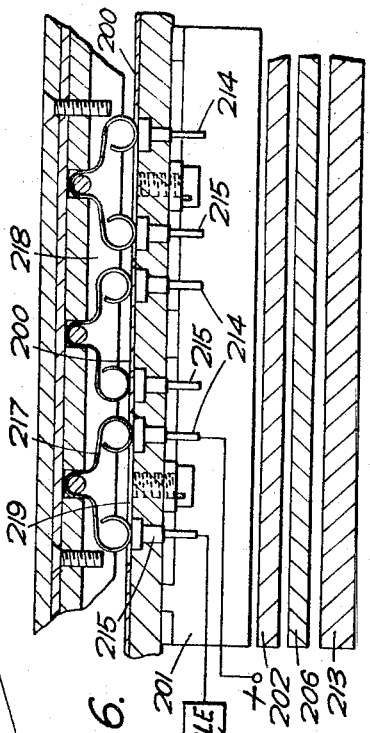
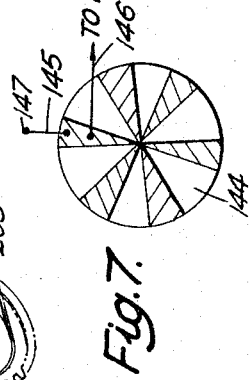

United States Patent Office 3,366,959
Patented Jan. 30, 1968

3,366,959
CHART POSITION INDICATING APPARATUS
Graham Estyn Roberts, London, England, assignor to Decca Limited, London, England, a British company
Filed May 27, 1966, Ser. No. 553,463
Claims priority, application Great Britain, June 3, 1965, 23,770
8 Claims. (Cl. 343—112)

ABSTRACT OF THE DISCLOSURE

A chart position indicating apparatus for use with navigation systems (usually hyperbolic navigation systems) providing two sets of signals representing orthogonal co-ordination of the chart position of a vehicle. The signals are used separately to drive a respective translucent strip to and fro in the same co-ordinate direction for the two members. Each member bears an index line disposed at an oblique angle to the direction of travel of the respective member and the two index lines are disposed at right angles, the members being disposed one above the other. The superimposition of the index lines defines at their intersection an index which is effectively movable in two orthogonal directions across the surface of a translucent chart arranged above the two movable translucent members. The apparatus is used in the same way as conventional chart position indicators, but the use of the obliquely disposed index lines enables the orthogonal chart directions to be along its diagonals which more effectively utilizes the chart area. The members are themselves continuous and are held each between two rollers driven by a sprocket drive from a system which effects an increment of drive movement for each quarter-cycle of phase change in the respective hyperbolic co-ordinate of the navigation system.

---

This invention relates to chart position indicating apparatus of the kind which may be used on a mobile craft in conjunction with a navigation system capable of providing signals representing information from which the chart position of a vehicle may be determined.

The object of the present invention is to provide a simpler, more compact form of chart position indicating apparatus.

According to the present invention, chart position indicating apparatus for use with a navigation system capable of providing at least two sets of signals representing positional information from which the chart position of a vehicle may be determined, comprises a chart, means for separately moving with respect to the chart surface two translucent or transparent members in accordance with said signals, each translucent or transparent member bearing an index line disposed at an oblique angle to the direction of movement of the member and the two marking lines being arranged so that they extend in orthogonal directions across the surface of the chart.

With the above construction, the intersection of the marking lines defines the chart position of the vehicle. The translucent members may be separately driven to and fro in the same direction across the chart in accordance with the signals representing the position of the vehicle. The chart may be regarded as having cartesian co-ordinates in the direction of the marker lines. Conveniently the marker lines may be disposed at an angle of 45 degrees to the direction of movement of the translucent members.

Each movable translucent member may be of flexible material, extending the width of the chart and is conveniently arranged so that the portions bearing the marking lines are arranged one over the other under the chart. This arrangement would facilitate the changing of charts, which in the present invention may be accomplished by simply removing the chart, which may be mounted in a suitable frame, from the front of the display unit. Hitherto, the changing of charts has been more complicated because it has been the practice to indicate one direction of movement of the craft by providing a chart mounted on rollers for movement past an indicating stylus, it being necessary to change at least one roller also and to thread the new chart through a guide system to put in operative position.

To avoid illuminating the display, a light toned, conveniently white, backing plate may be arranged adjacent the lower translucent member so that the marking lines and the chart markings, which would usually be opaque, are readily observable. The movable members may each be mounted on a pair of rollers driven in accordance with the signals representing the position of the vehicle. It is only necessary for one of each pair of rollers to be driven by a motor, the drive to the other roller bearing the other end of the translucent member being transmitted via a sprocket drive.

With the present invention, it would be usual for the operator when using the chart position indicating apparatus to set up the initial position of the aircraft manually. This can be done by manually overriding the motor. Alternatively, the drive to the drive rollers from the motor may be via a slipping clutch to enable the two movable members to be moved to the correct position by hand.

The arrangement of the present invention, wherein the movable members are movable in the same direction by parallel sets of rollers, enables a display unit to be considerably reduced in width so as to be substantially only the width of the chart. This feature is particularly advantageous when the apparatus is adapted to be used on a pilot's lap, since in such circumstances the dimensions of the display unit are of considerable importance.

The present invention is more particularly intended for use with a phase comparison radio navigation system of the kind known as the Decca Navigator and which is for example described in British specification No. 620,479. Such a navigation system employs a master station and preferably three slave stations spaced apart from one another and from the master station, the slave stations being known respectively as the red, green and purple slaves. Radio signals of different frequencies are radiated from the stations and a receiver in a vehicle is arranged to compare the phase of the signal received from each slave station with the signal received from the master station. This phase comparison is effected by bringing the two signals of each pair to be compared to a common comparison frequency and then applying signals of like frequency to a phase discriminator which produces two D.C. potentials, proportional respectively to the sine and cosine of the phase angle between the inputs to the phase discriminator and defining the position of the receiver with reference to a set of hyperbolic position lines having the two stations whose signals are compared at the foci of the hyperbolic position lines. In the receiving apparatus described in the aforementioned specification, the sine and cosine signals representative of the phase difference between master and slave signals are applied to phase angle indicators having registering mechanisms for counting complete cycles of phase change. The chart position indicating apparatus of the present invention is intended to be controlled by the D.C. potentials representative of the phase angles between the received radio signals and it will be assumed that a receiver providing such signals is available for use with the present invention. In the types of apparatus commonly used for indicating the chart position of a vehicle, the ratio of two D.C. potentials is used to drive a chart and an index so as to indicate the correct position of the vehicle within a cycle of phase change at the respective comparison frequencies. The present invention is particularly applicable to a system in which the accuracy of the indicated position is to the nearest quarter of a cycle of phase change at the respective comparison frequency. It will be appreciated that, as the position of the craft changes so that the phase angle between the two signals from two stations changes from one quadrant to another, there is a change in the sign of either the sine or cosine signal representing the phase angle between the signals derived from the two stations. From these sign changes the direction of travel can be determined.

A further feature of the present invention is a drive moving the chart in accordance with the changes in sign of the signals representing the sine and cosine of the phase angle between the phase comparison signals. As is explained for example in the specification of British patent specification No. 1,022,186 these sign changes can be fed, into an accumulator, which is conveniently a bi-directional counter so that both directions of travel may be accommodated. The drive motor for each translucent member may incorporate a disc, located on a driving shaft, and having a plurality of radially extending insulating strips separated by radially extending conducting strips, the disc being arranged to co-operate with wipers to produce an output signal when the wipers move from one strip to an adjacent strip, and arranged so that this movement corresponds to an integral number of quarter cycles of phase change. The motor is arranged to be energised to drive the chart when the storage of signals into the accumulator has occurred and to continue in this state until the total stored in the accumulator has been reduced to zero. The outputs from the disc and sensing wipers are arranged to be fed to the accumulator to reduce the stored total to zero as the motor drives the chart through a distance corresponding to the number of quarter cycles of phase change stored in the accumulator.

An accumulator may be used for each co-ordinate direction; alternatively a single accumulator may be used and the reading out of signals for one co-ordinate direction may take place after the total in the accumulator has been reduced to zero for the other co-ordinate direction.

The indicating apparatus as hereinbefore described is of the integrating kind that is to say the two marker lines move to register the changes in phase continually so that the indicated position changes in correspondence with the movements of the vehicle. It is, therefore, necessary to set the initially marking lines to indicate the position of the vehicles; this may be done utilising extraneous navigation information.

In the following description, reference will be made to the accompanying drawings in which:

FIGURE 5 is a simplified perspective view of a chart display employed in the apparatus of FIGURE 2;

FIGURE 6 is a sectional view through the apparatus of FIGURE 5; and

FIGURE 7 illustrates a detail of the apparatus of FIGURE 2.

Figure 1:
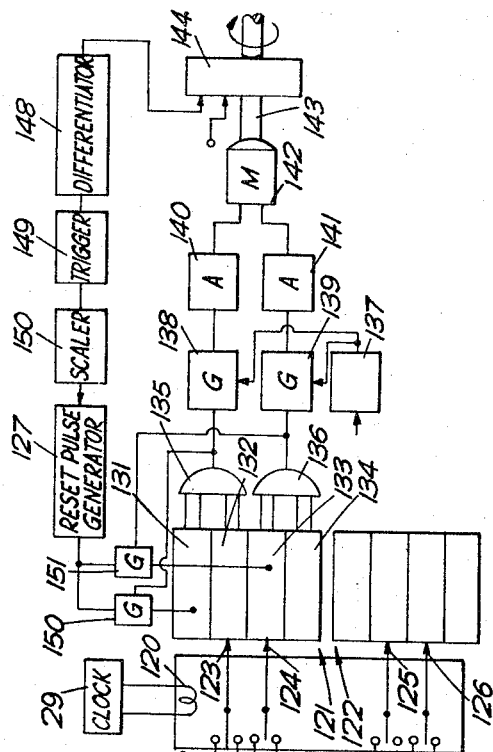
FIGURE 1 is a plan view illustrating the position of transmitting stations in a hyperbolic phase comparison navigation system.

The position indicating apparatus to be described hereinafter is arranged particularly for use with a hyperbolic navigation system having a master station and three slave stations which slave stations are for convenience called the red, green and purple slaves. The four transmitting stations are spaced apart and will generally be arranged in a star shaped pattern as shown in FIGURE 1 with the master M near the centre of the pattern and the red, green and purple slaves R, G and P disposed around the master. For the purposes of the present invention it may be assumed that these stations transmit continuous radio frequency signals. In the particular embodiment to be described, the master station transmits signals at a frequency $6f$ where $f$ is a fundamental frequency of the system and the red, green and purple slave stations transmit signals at frequencies $8f$, $9f$ and $5f$ respectively. The frequency $b$ is typically about 14 kc./s. The slave signals are locked in phase to the master signals so that by measurement of the phase relationship at a mobile receiver of signals received from the master and a slave station a position line through the position of the receiver is determined. The position line is one of a set of confocal hyperbolae having the master and slave station as foci. By using signals from the master and two slave stations, two intersecting hyperbolic position lines may be obtained, thereby defining the location of the receiver. The phase differences which correspond to the position lines are called hyperbolic co-ordinates. As will be explained in more detail hereinafter, the present invention utilises, for determining the receiver's position, not the hyperbolic co-ordinates themselves but changes in sign of the sines and cosines of the phase angles. It will be appreciated that as a phase angle between two alternating signals passes through 360 degrees, there are four changes in either the sine or the cosine of the phase angle, the changes occurring at $n\pi/2$. For many purposes and especially for airborne equipment an accuracy to a quadrant of phase difference, is quite sufficient for the determination of the position of a mobile receiver.

Figure 2:
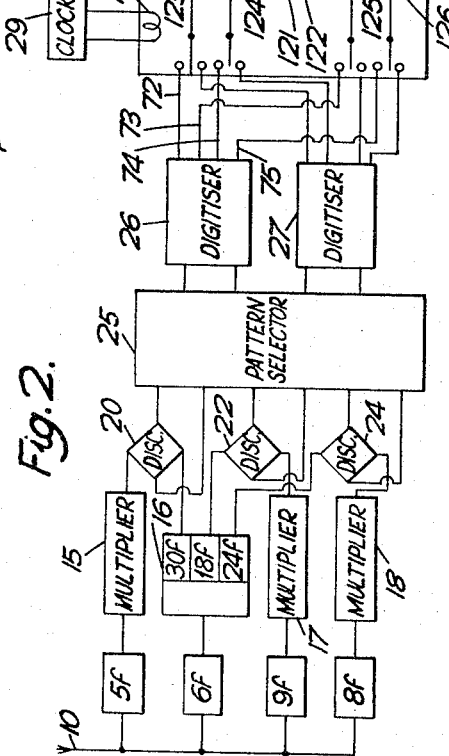
FIGURE 2 is a block diagram illustrating an automatic position indicating apparatus to be carried on a vehicle and for use with the transmitting stations of FIGURE 1.

In the apparatus of FIGURE 2, to determine the hyperbolic co-ordinates the signals are picked up by an aerial 10 and are amplified by amplifiers 11 to 14 tuned respectively to the frequencies $5f$, $6f$, $9f$ and $8f$. The outputs of the amplifiers are fed to frequency multipliers 15 to 18. The frequency multiplier 16 associated with the $6f$ signal from the master station separately multiplies the received $6f$ signal by factors of 3, 4 and 5 to provide outputs of $18f$, $24f$ and $30f$. The $30f$ output from the multiplier 16 is fed to one input of a phase discriminator 20 to the other input of which is fed a $30f$ output from the multiplier 15 which multiplies the received purple slave $5f$ signal by a factor of 6. The discriminator 20 provides two direct voltage outputs representing respectively the sine and cosine of the phase angle between the compared signal at the common comparison frequency of $30f$. The $18f$ output from the multiplier 16 is fed to one input of a discriminator 22 to the other input of which is fed an $18f$ output from the multiplier 17 which multiplies the received $9f$ green slave signals by a factor of 2. The discriminator 22 provides two voltage outputs representing the sine and cosine of the phase angle between the master and green slave signals at the common comparison frequency of $18f$. A $24f$ output from the multiplier 18, which multiplies the frequency of the received red slave signal by a factor of 3 is fed to one input of the discriminator 24 to the other input of which is fed the $24f$ output from the multiplier 16. The discriminator 24 provides voltage outputs representing the sine and cosine of the red phase angle at the common comparison frequency $24f$.

A hyperbolic phase comparison system of the above kind is more fully described in the specification of British patent specification No. 620,479 and reference may be made to that specification for further explanation of the construction and manner of operation of such a system. The sine and cosine outputs from the discriminators provide indications with respect to three sets of confocal hyperbolae, each set having a master station and the appropriate slave station as the two foci. In the system described in the aforementioned specification No. 620,479, these outputs are used to operate phase angle indicating meters. Each complete cycle of phase change represents a comparatively short distance of travel so that phase angle measurement within a cycle gives very accurate positional information, typically to a few metres, while counting of the complete cycles or a further phase comparison at a low frequency (say: $f$) provides coarse, i.e., unambiguous, positional information.

In the present apparatus, which is more particularly for use in aircraft, it is sufficiently accurate to determine the position to within one quarter of a cycle of phase change. For this purpose the sine and cosine signals are used directly, the instants when they go through zero magnitude representing the various successive quarter cycles; as will be described later, the phase angle information in quarter cycle units may be expressed in digital form. Before digitising the sine and cosine signals, it is necessary to select which two hyperbolic patterns are to be employed for position fixing. For this purpose, the three pairs of sine and cosine signals from the radio navigational receiver are fed into a pattern selector 25. Charts in chart position display apparatus usually cover only a small geographical area over which position fixing is possible and for any one chart it is only necessary to use two sets of hyperbolic position lines in order to determine the position of the receiver. As will become clear, the chart display is to move indicators in orthogonal directions with respect to a chart, in accordance with common practice in this type of receiver, each orthogonal direction on the chart corresponding to a direction of increase of a respective hyperbolic co-ordinate. Accordingly, one movement in an orthogonal direction on the chart may be expressed as the number of sine or cosine sign changes, from a datum, in one hyperbolic co-ordinate and the other chart co-ordinate may be expressed as the number of sine or cosine sign changes, from a datum, in the other hyperbolic co-ordinate.

The pattern selection is effected in accordance with the particular chart in use. The putting of a chart into the display unit enables certain data relative to the chart to be obtained automatically and amongst the data are the necessary signals for operating two relays in the selector 25, which selects the appropriate two pairs of sine and cosine signals representing two position lines, which pairs of signals are then fed to the digitiser 26 and 27. For example, the "red" sine and cosine signals (that is to say signals representing the phase difference between the master and red slave transmissions) might be fed to the digitiser 16, and the "green" sine and cosine signals (that is to say the signals representing the phase difference between the master and green transmissions) to the digitiser 27. Such selection can be effected using two relays only.

Figure 3:
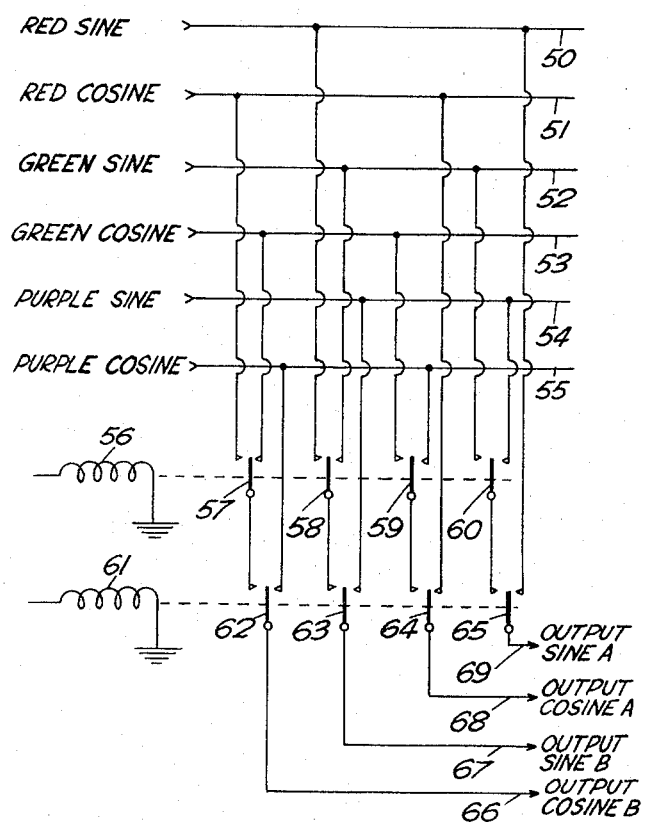
FIGURE 3 is a diagram illustrating a selector circuit employed in the apparatus of FIGURE 2.

One construction of the pattern selector 25 is illustrated in FIGURE 3. The red sine, red cosine, green sine, green cosine, purple sine and purple cosine signals are applied respectively to six input lines 50 and 55. The selection is effected by two relays, the first of which has an operating coil 56 controlling four change-over contacts 57, 58, 59 and 60. The second relay has an operating coil 61 controlling four change-over contacts 62, 63, 64 and 65. The contacts 58, 60, 63 and 65 are for sine signals whilst contacts 57, 59, 62 and 64 are for cosine signals. The movable contacts 62 to 65 are connected respectively to four output leads 66 to 69. Considering the sine signals, the contacts 63 and 65 when moved to the right in the drawing select the red as the first or A output on lead 69 and the purple as the second or B output on lead 67. In the left hand position, these contacts 63, 65 enable contacts 58 and 60 to be effective so that either green is fed to the A output and red to the B output or the purple is fed to the A output and green to the B output. The cosine signals are selected by contacts 57, 59, 62 and 64 in a similar way so that the output gives the red and green signals or the red and purple signals or the green and purple signals according to the setting of the two relays.

The two relays in the pattern selector enable the signals of any pair of colours to be chosen. These are fed to the two digitisers 26 and 27. Many types of digitiser are known and would be suitable for use in the present apparatus. In the particular embodiment of digitiser illustrated in FIGURE 4 each digitiser is arranged to produce an impulse when the sine and cosine signals pass through zero, the pulse being stored on a capacitor which remains charged until the pulse is subsequently utilised, whereupon the signal is cancelled. Each digitiser 26 and 27 provides two separate independent outputs since, in the particular display system being described, each co-ordinate of the display may be formed by combining two signals, for example red and green signals. The digitisers also contain means for inhibiting one out of each four successive pulses or two out of each four pulses from each of the various outputs to give scale changing facilities on the display since the output pulses can then correspond to the quarter cycles or half cycles of each whole cycles of phase change. In will be seen that one digitiser might give for example a first output, representing each quarter cycle of phase change of the red pattern and a second representing each full cycle of phase change of the same pattern.

Figure 4:
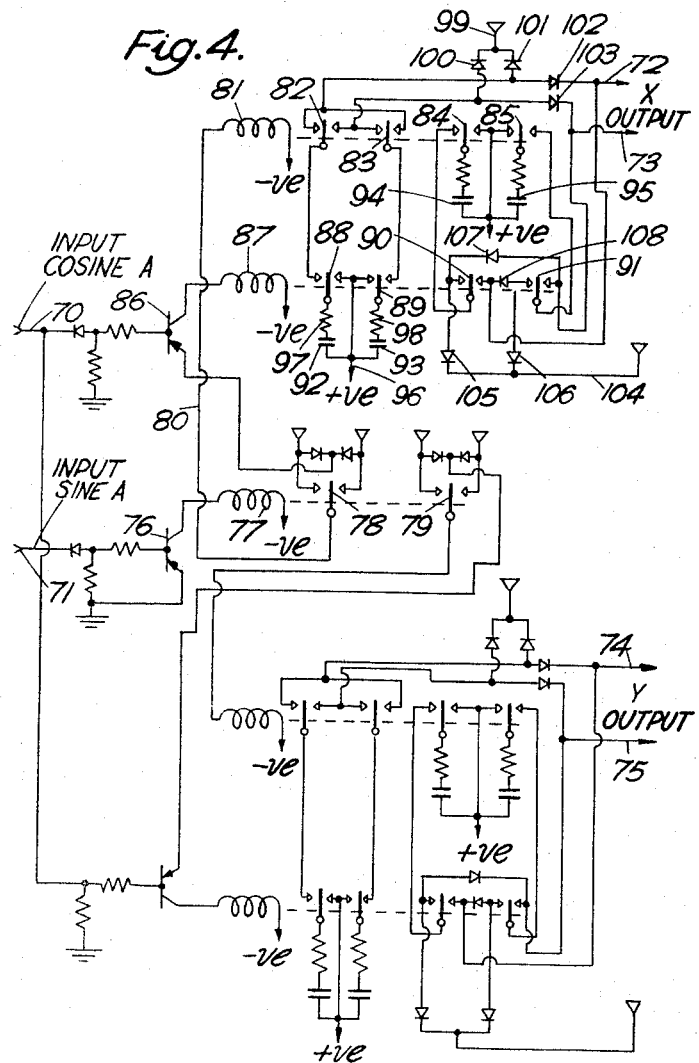
FIGURE 4 is a diagram illustrating a digitiser employed in the apparatus of FIGURE 2.

Referring to FIGURE 4, there is illustrated the digitiser 26. This has inputs on leads 70 and 71 representing the cosine and sine signals from output A of the pattern selector 15, that is the signals from leads 68 and 69 respectively of FIGURE 2. The digitiser provides four outputs on leads 72, 73, 74 and 75. The outputs on leads 72 and 73 are for the X co-ordinate of the display and the outputs on leads 74 and 75 for the Y co-ordinate. The signals on leads 72 and 73 correspond respectively to the two directions of motion for the X co-ordinate whilst leads 74 and 75 correspond respectively to the two directions of motion for the Y co-ordinate.

The sine signal input on lead 71 is applied to the base of a transistor 76 having an operating coil 77 of a relay in the collector circuit. This relay has two change-over contacts 78, 79 which are employed for the X and Y co-ordinate directions respectively. Considering the X co-ordinate direction, the contact 78 is connected during positive half cycles of the input sine signal to a source $c$ and during negative half cycles to a source $d$. Only one of these sources is energised, source $c$ being energised for the "normal" output and source $d$ for the "reverse" output. "Normal" and "reverse" refer to the sense of displacement required in the co-ordinate direction compared with the sense of the change of the sine signal; thus for example if the sine changes in a direction corresponding to an increase in the measured phase relationship, by selection of the $c$ and $d$ sources, this may be made to give either an increase or a decrease in the X co-ordinate. The contact 78 is connected to a lead 80 which is thus energised only during alternate half cycles. This lead 80 is connected to the operating coil 81 of a further relay having four change-over contacts 82, 83, 84 and 85. These contacts are thus operated and released once in each cycle of the sine input on lead 71 approximately when the sine signal passes through zero. The transistor 76 ensures that the operation of contacts 78, 79 and hence of contacts 82 to 85 occurs approximately when the sine signal input passes through zero. It will be noted however that, by the alternative selection of either one of the two alternative input sources $c$ and $d$ the phase of the operation of the contacts 82 to 85 can be reversed. The cosine input signal on lead 70 is applied to the base of a transistor 86, the collector circuit of which includes an operating coil 87 of a further relay having four change-over contacts 88–91. These contacts thus change-over approximately when the cosine signal passes through zero.

If the measured phase angle is increasing, the cosine signal passes through zero going in a negative direction when the sine signal is positive and goes through zero in a positive direction when the sine signal is negative. If the phase angle is decreasing, the cosine signal passes through zero going in a positive direction when the sine signal is positive and goes through zero in a negative direction when the sine signal is negative. The circuit now to be described makes use of this distinction to provide output pulses on one or other of the leads 72, 73 according to the direction in which the phase angle is changing. On the appropriate output line, there can be four pulses for each cycle of phase change, occurring when the sine and cosine signals pass through zero. Provision is made, however, for suppressing the two pulses in each cycle which occur when the cosine signal passes through zero and for suppressing one of the pulses in each cycle which occur when the sine signal passes through zero. It is thus possible to obtain 1, 2, 3 or 4 pulses in each cycle. In practice the selector would be arranged to select either 1, 2 or 4 pulses per cycle.

These pulses are obtained by discharging capacitors which are connected into charging circuits by the contacts 82 to 85 and 88 to 91, the discharge circuit being completed via the output lines 72, 73 by relays in a scanning unit 18 to be described later. The part of the circuit shown in FIGURE 3 thus has merely to ensure that the capacitors are discharged before connecting them in the charging circuit at appropriate times in each cycle. Four capacitors 92, 93, 94 and 95 are employed, one for each of the four possible pulses in a cycle. Considering firstly the capacitors 92, 93, one pole of each capacitor is connected in common to a positive potential supply lead 96. The other poles are connected through resistors 97, 98 respectively to the contacts 88, 89. In one position of these contacts 88, 89, the capacitor 93 and its series resistor 98 is short-circuited and the other capacitor 92 via its series resistor 97 is connected to contact 82. In the other position of contacts 88, 89, the capacitor 92 and its series resistor is short-circuited whilst the capacitor 93 is connected via its series resistor 98 to the contact 83. The fixed contacts co-operating with movable contacts 82, 83 are connected to the output lines 72, 73 in opposite senses. Suppose the measured phase angle is increasing and source c is energised so that coil 81 is energised in phase with the sine signal. When the cosine signal passes through zero in the increasing direction, so that contacts 88, 89 move to the left, the coil 81 will be unenergised and the contacts 82, 83 will be in the right hand position. Thus the movement of contacts 88, 89 prepares a charging circuit from lead 96 via capacitor 92, resistor 97, contact 88, contact 82 to the output line 73. A quarter of a cycle later, the contacts 82, 83 will change over so that when contacts 88, 89 change over a further quarter cycle later, the capacitor 92 is discharged and capacitor 93 is connected in a charging circuit from lead 96 via resistor 98 contact 89 and contact 83 to the output line 73. Thus, provided the charging circuits are duly completed within a half cycle of the operation of the contacts 88, 89, two output pulses will be given on lead 73 for each complete cycle, these pulses occurring after the cosine signal passes through zero, as soon as the external circuit from lead 73 is completed. It will be seen that if source d instead of source c is energised, the output pulses will be on line 72 instead of on line 73. These two pulses can be optionally suppressed by applying a positive bias signal to a lead 99 connected to the junction of two back-to-back rectifiers 100, 101 connected between the output leads 72, 73.

The contacts 84, 85, 90, 91 operate in a similar manner to the contacts 82, 83, 88, 89 to provide charging circuits for the capacitors 94, 95. These contacts, however, prepare the charging circuit when the sine signal passes through zero. The output pulses from these capacitors 94, 95 occur alternately with output pulses from capacitors 92, 93. The output pulses from capacitors 94, 95 are fed to the lines 72, 73 beyond the pulse suppression circuit 99–101 and blocking rectifiers 102, 103 are provided to prevent this pulse suppression circuit from affecting the pulses from capacitors 94, 95. Provision is made for suppressing one pulse from the capacitors 94, 95 in each cycle by applying a positive bias signal on a lead 104 via blocking rectifiers 105, 106 to bias two further rectifiers 107, 108 thereby preventing any output pulse being obtained via relay contact 90.

The circuit arrangement shown in FIGURE 4 for feeding the Y co-ordinate output lines 74, 75 is identical with that for the X co-ordinate lines 72, 73 and will not be further described. It will be noted that the selection of the number of pulses in each cycle for the Y co-ordinate direction is made independently of the selection for the X direction.

The digitiser 26 is similar to the digitiser 27 and provides outputs for both the X and Y co-ordinate directions from the phase comparison of a different pair of inputs selected by the pattern selector 25. The various outputs from the digitiser 26 and 27 are fed to the aforementioned scanning unit 28 which is controlled by a clock pulse generator 29 delivering clock pulses at a rate faster than the maximum possible rate of change of a quarter cycle in phase. Typically, for subsonic aircraft using a phase comparison system with frequencies as set forth above, the clock pulse generator 29 might operate at a frequency of two cycles per second, to give an alternating signal fed to relay operating coil 120, so that the relay contacts are operated at four cycles per second. The relay in the scanning unit serves to feed pulses representing the passage through zero of sine and cosine signals from the first output of digitiser 26, that is to say the X co-ordinate on leads 72 and 73, to an accumulator 121 via an input lead 123 for one direction of change of angle and via lead 124 for the other direction of change. The sine and cosine pulses cannot occur simultaneously and thus these pulses occur in serial form. In the other position of the relay contact the sine and cosine pulses from the first output of digitiser 27 that is to say the X co-ordinate pulses are fed to the input leads 123 and 124 accordingly to the direction of change. Likewise the sine and cosine signal pulses from the second outputs of digitisers 26 and 27 are fed to an accumulator 122 via input lead 125 for one direction of count while the sine and cosine signals from the second outputs of the two digitisers are fed to the accumulator 122 via an input lead 126 for the other direction of movement. These accumulators are eight bit bidirectional counters. The accumulator 121 serves to combine all the pulses from the first outputs from digitisers 26 and 27 whilst accumulator 122 combines all the pulses from the second outputs of the two digitisers.

There are two inputs to each accumulator: leads 123 and 124 for accumulator 121 and leads 125 and 126 for accumulator 122. The leads are used according to whether the units are to be added or subtracted from the accumulated totals. Since the digitisers 26 and 27 retain the digital information until it is used it is immaterial that digital input pulses might sometimes occur simultaneously on two digitisers. The relay contacts in the scanning unit will select first one and then the other so that the appropriate inputs will be fed into the accumulator. After all the various pulses have been fed in, the totals in the accumulators represent the number of sign changes that have occurred since a previous comparison was made. Reset pulse generators 127 and 128 are provided for feeding reset pulses into the two accumulators in order to reset the totals in them towards zero. The manner of operation of these reset pulse generators will be made clear shortly.

There now follows a description of the chart display itself. The display is of the kind utilising a geographically distorted chart such that the orthogonal directions of movement of an index (representing the position of the vehicle) with respect to the chart in use correspond to the directions of increase of the two hyperbolic co-ordinates in accordance with which the chart is drawn. It will be apparent that this enables the two movements to be effected separately, each from the sign changes associated with changes in a respective hyperbolic co-ordinate. In FIGURE 5, which is an expanded view of the chart display from above, the chart member 200 is laid over a rigid supporting frame 201 (of insulating material) and may have a supporting plate of glass or other rigid transparent material (not shown) underneath it. The chart is square and has navigational and geographical information printed on it in opaque markings. Movable underneath the chart is an endless elongate strip 202 carried between two rollers 203 and 204, which are connected together by sprocket holes 205 in the strip 202 so that the strip may be driven without buckling by driving the right hand roller 204. Underneath the first strip is a second strip 206 carried between the two rollers 207 and 208 connected together by the sprocket holes 209 in like manner. Each strip carries an opaque indicating line 211 and 212 respectively disposed at different 45° angles to the movement of the strips. The two lines on the strips co-operate to indicate at their intersection 210 the position of the vehicle. It will be seen that their movements relative to each other and the chart are in orthogonal directions. The two strips are supported in their passage under the chart by the backing plate 213, which has a light toned, metal surface so that the chart markings and lines can be easily seen without the need to illuminate the chart from below.

In FIGURES 5 and 6, which latter is a section through the display device, are shown the features that at one side of the chart co-operate to produce signals identifying the chart and providing signals for the pattern selector 25. Along one upper side of the frame 201, generally beneath the chart, are contact studs 214 and 215. Alternate studs 214 are connected to a common voltage supply line while each stud 215 is connected to a bistable device, shown diagrammatically at 216, whose states depend on the presence or absence of a voltage at the respective stud 215. Each chart is arranged to permit or prevent conduction between selected adjacent pairs of studs 214 and 215, and is arranged so that the bistable devices 216 can provide a unique set of outputs defining the "constants" of the chart; more particularly for the purposes of the present invention, two devices 216 are coupled to the relays in the pattern selector to ensure that the correct pattern of hyperbolic co-ordinates is used for the chart. Other "constants" may be used elsewhere in the apparatus, but their use is not directly relevant to the present invention. The connection between adjacent pairs of contacts is made by a respective conductive strip 217, which has two end arcuate portions contacting the studs and is secured in the cover plate frame 218 of the display. The cover plate is removable to permit the changing of charts; conveniently it is hingeably mounted. The chart is arranged to extend over all the contacts and is cut away (as at 219 and 220 in FIGURE 5) to expose those pairs of contacts that are to be connected. The chart and contact arranged is conveniently provided at the opposite side of the chart if the number of chart constants required warrants.

There now follows a description, again with reference to FIGURE 2, of the driving of the chart once the appropriate number of sign changes have been fed to the accumulators 121 and 122. Only that associated with accumulator 121 will be described: the drive from the other accumulator is entirely analogous.

The accumulator 121 is in two halves: two stages 131 and 132 storing a maximum of four sign changes for one direction of count and the other two stages 133 and 134 storing a maximum of four sign changes for the other direction of count. Each state of the two stages 131 and 132 is sensed by one of the four inputs of OR gate 135, while each state of the two stages is sensed by one of the four inputs of OR gate 136. The control unit 137 provides gate opening signals to open gates 138 and 139 to feed the outputs of the OR gates to current amplifiers 140 and 141, each of which provides an energising signal to drive the motor 142 in the direction corresponding to the direction of movement stored as sign changes in the respective accumulator: the energising signals are of opposite polarity and cannot occur at the same time.

The output shaft 143 of motor 142 drives roller 203 through appropriate gearing. Also coupled to the output shaft 143, or, as shown, mounted on it, is a disc 144 which is shown in more detail in FIGURE 7. On one side of the disc is a plurality of radially extending conductive segments, whose angular extent is arranged so that the disc's traversal through a segmental angle corresponds to an integral number of or a simple fraction of quarters of a cycle of phase change. The disc is an insulator: two radially separated wipers 145 and 146 bear on the disc, the wiper 145 being coupled to a potential source 147 and wiper 146 being coupled to a differentiator 148 and a trigger circuit 149 arranged to produce a unidirectional pulse output on receipt of a pulse of either polarity. At the output of the trigger circuit is a scaling unit 150 which is arranged to inhibit a proportion of the received pulses so that the transmitted pulses each correspond to a movement of the strip 202 through a distance equivalent to a quarter of a cycle of change of the respective hyperbolic co-ordinate. This scaling unit, which may be conventional in form is necessary because different pairs of signals transmitted from the stations are compared at different common comparison frequencies and the distances embraced by a quarter of a cycle of phase change are different.

Each pulse transmitted by the scaling unit is fed to the reset pulse generator, which provides a pulse to reduce the total in the appropriate pair of stages in the accumulator by unit according to which gate 150 or 151 is opened by the output from OR gates 135 and 136 respectively. Thus the marker line 211 is driven until the respective accumulator total has been reduced to zero: the line rests until the next cycle of operations.

The control unit 137 is operated by a pulse from clock pulse generator 29 after the storing of the sign changes has ended.

It is not necessary for the lines 211 and 212 to be at 45° to the direction of movement of the strips 202 and 206; it may be convenient in some circumstances for them to be at other angles: they must however be at right angles to each other.

I claim:

1. Chart position indicating apparatus for use with a navigation system capable of providing at least two sets of signals representing positional information from which the chart position of a vehicle may be determined, comprising a chart, two movable translucent members each bearing an index line disposed at an oblique angle to the direction of movement of the member, the two index lines being arranged so that they extend in orthogonal directions with respect to the surface of the chart, and means for separately moving with respect to the chart the two translucent members in accordance with said signals.

2. Apparatus as claimed in claim 1, wherein each movable translucent member is of flexible material extending at least the width of the chart and is arranged so that the portions bearing the index lines are arranged one over the other under the chart.

3. Apparatus as claimed in claim 2, wherein a light toned backing plate is arranged adjacent the lower translucent member to render the index lines and the chart markings readily observable and to support the members.

4. Apparatus as claimed in claim 3, wherein each movable member is mounted on a pair of rollers driven in accordance with one set of said signals.

5. Apparatus as claimed in claim 4, wherein each said pair of rollers and said member are coupled together by a sprocket drive, each pair of rollers being driven by a motor driving one roller from one output of the radio navigation system.

6. Chart position indicating apparatus for use with a hyperbolic phase comparison radio navigation system of the kind wherein, at a mobile receiver, two signals representing the hyperbolic co-ordinates of the mobile craft are obtained, comprising a chart, two movable members each mounted for movement to and fro in the same direction parallel to and across the chart, each member bearing an index line disposed at an oblique angle to the line of movement of the member, the two index lines being mutually orthogonal; a respective drive means for each member; separate means responsive to each hyperbolic co-ordinate for integrating and storing a number of quadrants of phase change from a datum traversed by said receiver; means responsive to said number of quadrants for energising the respective drive means to move the respective index line a corresponding distance.

7. Apparatus as claimed in claim 6, wherein said radio navigation system provides more than two sets of signals, and wherein at least one side of the chart is selectively cut away to permit or prevent selectively conduction between pairs of electrical contacts, bistable means being coupled to each pair of contacts for providing control signals for selecting the two sets of hyperbolic co-ordinates appropriate for the chart.

8. Apparatus as claimed in claim 6, wherein the means for driving the member is arranged to reduce the stored total as the member moves and is arranged to stop when the stored total is reduced to said datum.

References Cited
UNITED STATES PATENTS 3,113,313  12/1963  Roberts _____ 343—112 X
3,249,942  5/1966  Fernandez _____ 343—112

RODNEY D. BENNETT, *Primary Examiner.*

R. E. BERGER, *Assistant Examiner.*